US005889797A

United States Patent [19]

Nguyen

[11] Patent Number: 5,889,797

[45] Date of Patent: Mar. 30, 1999

[54] MEASURING SHORT ELECTRON BUNCH LENGTHS USING COHERENT SMITH-PURCELL RADIATION

[75] Inventor: Dinh C. Nguyen, Los Alamos, N. Mex.

[73] Assignee: The Regents of the University of California, Los Alamos, N. Mex.

[21] Appl. No.: 915,240

[22] Filed: Aug. 20, 1997

Related U.S. Application Data

[60] Provisional application No. 60/024,612, Aug. 26, 1996.

[51] Int. Cl.[6] .......... H01S 3/00

[52] U.S. Cl. .......... 372/2; 372/9

[58] Field of Search .......... 372/2, 9; 315/4, 315/5

[56] References Cited

U.S. PATENT DOCUMENTS

| | | | |
|---|---|---|---|
| 3,586,899 | 6/1971 | Fleisher | 315/4 |
| 4,596,967 | 6/1986 | Ekdahl | 331/82 |
| 4,727,550 | 2/1988 | Chang et al. | 372/2 |

OTHER PUBLICATIONS

Ishi et al; "Observation of coherent Smith–Purcell radiation for short bunched electrons";Physical Review E,vol. 5t1, No. 6; Jun. 1995.

K. Ishi, Y. Shibata, T. Takahashi, S. Hasebe, M. Ikezawa, K. Takami, T. Matsuyama, K. Kobayshi, and Y. Fujita, "Observation of Coherent Smith–Purcell Radiation From Short–Bunched Electrons", Physical Review E, vol. 51, No. 61, pp. R5212–R5215, Jun. 1995.

G. Doucas, J. H. Mulvey, M. Omori, J. Walsh, and M. F. Kimmitt, "First Observation of Smith–Purcell Radiation from Relativistic Electrons", Physical Review Letters, vol. 69, No. 12, pp. 1761–1764, Sep. 21, 1992.

*Primary Examiner*—Leon Scott, Jr.
*Attorney, Agent, or Firm*—Ray G. Wilson

[57] ABSTRACT

A method is provided for directly determining the length of sub-picosecond electron bunches. A metallic grating is formed with a groove spacing greater than a length expected for the electron bunches. The electron bunches are passed over the metallic grating to generate coherent and incoherent Smith-Purcell radiation. The angular distribution of the coherent Smith-Purcell radiation is then mapped to directly deduce the length of the electron bunches.

4 Claims, 7 Drawing Sheets

MEASURING SHORT ELECTRON BUNCH LENGTHS USING COHERENT SMITH-PURCELL RADIATION

This invention was made with government support under Contract No. W-7405-ENG-36 awarded by the U.S. Department of Energy. The government has certain rights in the invention.

This invention claims the benefit of provisional U.S. application Ser. No. 60/024,612, filed Aug. 26, 1996.

BACKGROUND OF THE INVENTION

This invention relates to measuring electron beam parameters, and, more particularly, to measuring the length of subpicosecond electron beam bunches.

Recent experiments using electron accelerators have demonstrated the generation of subpicosecond electron bunches. These short electron bunches are the enabling technology for many important radiation sources ranging in wavelength from x-rays to the far-infrared. The tunable femtosecond radiation bunches that are produced will greatly benefit the rapidly growing field of ultrafast phenomena, an area spanning femtosecond excitation and ionization of atoms and molecules, to imaging ultrafast motion of biological molecules. The femtosecond electron bunches can also be used to produce wakefield accelerators, an advanced accelerator concept that could usher mankind into a new era of high-energy physics.

As the generated electron bunch lengths get shorter, it becomes increasingly difficult to measure the bunch length. Unfortunately, diagnostic techniques for electron beam bunches have not kept pace with the technology for producing short electron bunch lengths. The present technique for measuring the length of sub-picosecond electron bunches fall into three main categories: the time-domain methods using a streak camera, the frequency-domain methods using either coherent undulator radiation or coherent synchrotron radiation, and the autocorrelation method using a Michelson interferometer. All these methods involve expensive instruments and sophisticated setups. An ideal diagnostic method for measuring electron beam bunch lengths must be inexpensive, easy to set up, non-intercepting, and capable of measuring a single electron bunch.

Time-domain method (Streak camera): This device uses a photocathode to convert incoming light into electrons that are swept by an applied radio-frequency field. The electrons impinge on a phosphorescent screen and cause the latter to emit light. The width of the electron image on the screen is a measure of the electron bunch length. This technique is a direct measurement of the electron bunch length. However, besides being very expensive, the streak camera method cannot measure bunch lengths shorter than 200 fs. Even with longer bunch lengths, a picosecond temporal resolution is difficult to achieve due to temporal jitter inherent in the streak camera. Furthermore, the method requires a means to convert electrons into visible light that falls within the wavelength response curve of the streak camera photocathode. A commonly used method to convert the electron bunches into light pulses is to impinge the electron beam on a metal screen and observe the so-called optical transition radiation (OTR). Because of the low intensity of OTR light, streak camera measurements often require that the measurement be done over many electron bunches. As the OTR screen also disrupts the electron beam, this is not a non-intercepting diagnostic method.

Frequency-domain method: This is an indirect method based on the frequency spectrum of light emitted when electrons traverse an undulator (a series of alternating magnets) or a circular bend. In the first case, the light emitted is called coherent undulator radiation; in the second, coherent synchrotron radiation. The method assumes a knowledge of the electron bunch shape in order to convert spectral information to bunch length. It also requires a spectrometer to measure the spectra of the coherent radiation. The spectra are often collected by scanning the spectrometer, thus making this a time-averaged measurement (not a single-bunch measurement).

Autocorrelation method: This technique uses a device called a Michelson interferometer to measure the overlap between the light pulses that the electrons produce. The electron bunches impinge on a screen to produce coherent OTR light. The light is split into two beams by a beam splitter and then sent to two perfectly aligned mirrors that return the lights back to the beam splitter where they recombine. One of the mirrors is moved to vary the distance between the two light paths. As its distance varies, the light patterns interfere to produce an interferogram from which the bunch length is reconstructed. This technique is indirect, intercepting (because it uses an OTR screen) and not a single-bunch method.

Recently, a group of researchers in Japan (K. Ishi et al., "Observation of coherent Smith-Purcell radiation from short-bunched electrons," 51 *Phys. Rev. E*, pg. R5212 (1995)) reported the observation of coherent Smith-Purcell radiation emitted from picosecond electron bunches traveling near the surface of a grating—a surface made out of aluminum on which small grooves are cut. In contrast to the usual incoherent Smith-Purcell radiation, the observed coherent Smith-Purcell radiation depends quadratically on the number of electrons in the bunch. The coherent Smith-Purcell radiation is, thus, many orders of magnitude greater than the incoherent radiation. These workers used the phenomenon to study the possibility of producing mm-wave radiation from short, but not subpicosecond, electron bunches. They detected the coherent Smith-Purcell radiation at large angles using a spectrometer.

The present invention recognizes that the coherent Smith-Purcell radiation observed for picosecond electron bunches can be used as a diagnostic for determining electron bunch lengths in electron beams. Electron beam bunches are made to travel above the surface of a grating. The coherent Smith-Purcell radiation is emitted at large angles with respect to the beam propagation direction. The angular distribution of the emitted radiation depends on the electron bunch length so that electron bunch length is directly deduced from measured angles of the emitted Smith-Purcell radiation.

Accordingly, an object of the present invention is to measure ultrashort electron bunch lengths down to a few femtoseconds.

Another object of the present invention is to measure electron bunch length with very few assumptions or complexities to yield a unique measurement of the bunch length.

One other object of the present invention is to provide a non-invasive, non-intercepting method of electron beam diagnostics.

Yet another object of the present invention is to measure the length of a single bunch of electrons.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise a method for determining the length of short electron bunches. A metallic grating is formed with a groove spacing greater than a length expected for the electron bunches. The electron bunches are passed over the metallic grating to generate coherent and incoherent Smith-Purcell radiation. The angular distribution of the coherent Smith-Purcell radiation is then mapped to directly deduce the length of the electron bunches.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1A:
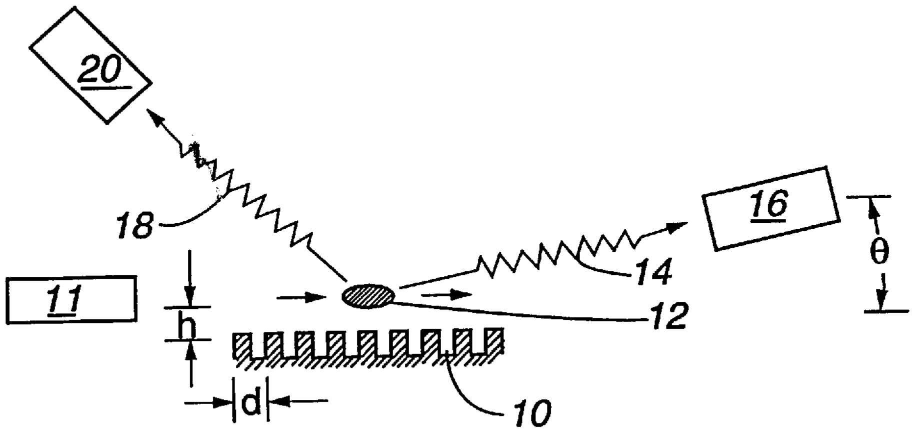
FIGS. 1A and 1B schematically depict apparatus for measuring Smith-Purcell radiation (SPR) related to electron bunch lengths.

This invention provides a measure of the longitudinal length of an electron bunch through the use of coherent Smith-Purcell radiation. When an electron beam traverses close to the surface of a metallic diffraction grating, the electrons in the beam emit incoherent Smith-Purcell radiation (SPR) in the millimeter (mm) and sub-mm (far-infared) regions. This radiation is emitted over a large range of angles, with the shortest wavelength directed in the forward direction (0°), and the longest wavelength directed in the backward direction (−180°), according to the following expression, $$\lambda = \frac{d}{n}\left(\frac{1}{\beta} - \cos\theta\right) \quad (1)$$

where d is the groove spacing of the diffraction grating, n is the diffraction order (assumed to be 1 hereafter), β is the usual beam velocity normalized to the speed of light, β=v/c, and θ is the angle of the emitted SPR light relative to the grating surface.

If the electron bunch length is long compared to the SPR wavelength, the radiation emitted by a relativistic electron beam occurs mostly in the forward direction, as has been observed by Doucas et al., 74 *Phys. Rev. Left.*, pg. 3808 (1995). For relativistic beams (γ>10), the plot of incoherent SPR intensity versus θ reaches a maximum at an angle approximated by $$\theta_{max} \approx \cos^{-1}\left(1 - \frac{1}{4\gamma^2} - \frac{2\pi\beta h}{\gamma d}\right) \quad (2)$$

where γ is the beam relativistic factor, $$\gamma = \frac{1}{\sqrt{(1-\beta^2)}},$$

and h is the beam height above the grating. Note that for large γ, the third term (~1/γ) dominates over the second term (~$1/\gamma^2$), and it is possible for incoherent SPR to peak at a large angle if the beam height is comparable to the grating period. Thus, an observation of large angle emission alone is not sufficient evidence for coherent SPR.

Recent experiments on SPR using picosecond electron bunches hinted that the coherent SPR should be orders of magnitude stronger than the incoherent one. As the electron bunch length becomes comparable to the SPR wavelength, the plot of intensity versus angle will exhibit additional high-intensity lobes. Since long wavelengths occur at large angles, the degree of coherent enhancement should increase with angle. For picosecond bunches, coherent SPR should be detected first at large angles, almost in the backward direction.

The intensity of SPR per unit solid angle per unit grating length as a function of emitted angle for both coherent and incoherent SPR is given by $$\frac{dP_n}{d\Omega} = \frac{eln^2\beta^3}{2\epsilon_0 d^2}|R_n|^2(1 + NF(\sigma_z,\lambda))\left(\frac{\sin^2\theta\cos^2\phi}{(1-\beta\cos\theta)^3}\right)e^{-\frac{4\pi h}{\beta\gamma\lambda}\sqrt{1+(\beta\gamma\sin\theta\sin\phi)^2}} \quad (3)$$

where e is the electron charge, l is the beam current, n is the grating order, $\epsilon_0$ is the permitivity of free space, $|R_n|^2$ is the square of the grating reflectivity, N is the number of electrons in the bunch, θ and Φ are the angles of observation with respect to the beam direction, and $f(\sigma_z,\lambda)$ is the factor between 0 and 1 as given by the square of the Fourier transform of the longitudinal density function, S(z)

$$f(\sigma_z,\lambda) = \left|\int S(z)e^{\frac{i2\pi\sigma}{\lambda}}dz\right|^2 \quad (4)$$

The form factor $f(\sigma_z,\lambda)$ approaches 1 when the bunch length $\sigma_z$ is comparable to or less than the grating period. Equation (4) is only correct for one-dimensional beams, i.e. beams with zero transverse profile. For electron beams with finite transverse dimensions, additional corrections must be applied to take into account three-dimensional effects. Because N is a very large number, on the order of $10^8$, the coherent signal is much larger than the incoherent radiation as the form factor approaches 1.

Figure 3:
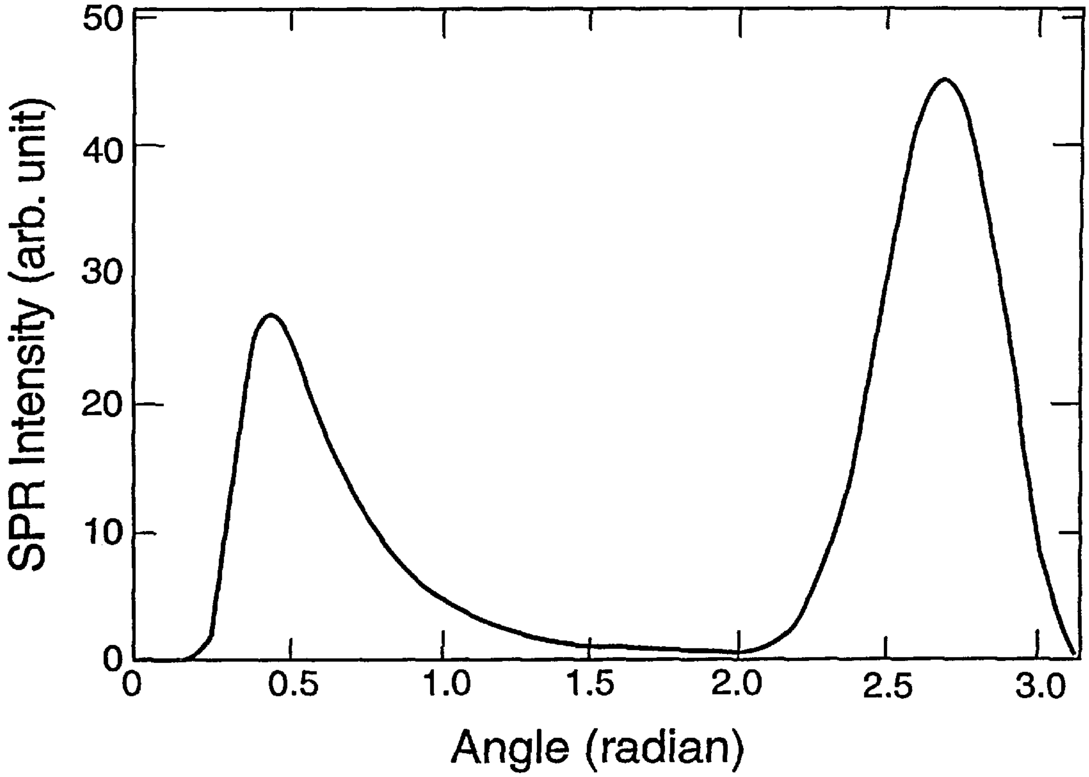
FIG. 3 graphically depicts a calculated SPR intensity-angle distribution for a gaussian bunch with $10^8$ electrons and an rms bunch length of 0.16 mm (533 fs).

With a judicious choice of the groove spacing for a given electron bunch length, e.g., a spacing about twice the expected bunch length, there is a range of angles whereby the coherent SPR will appear as a strong lobe or lobes at large angles above an almost-zero background of incoherent SPR at small angle (see FIG. 3). By measuring the angular position of the coherent SPR peak or by ratioing its intensity to the incoherent SPR peak, the electron bunch length is deduced.

The peak of the coherent SPR distribution occurs at an angle that depends on the number of electrons in the bunch and the form factor. The angular distribution of the coherent SPR signal is analyzed and, from the angular distribution and the number of electrons in the bunch (i.e., the measured bunch charge), a measure of the electron bunch length is produced.

Figure 1B:
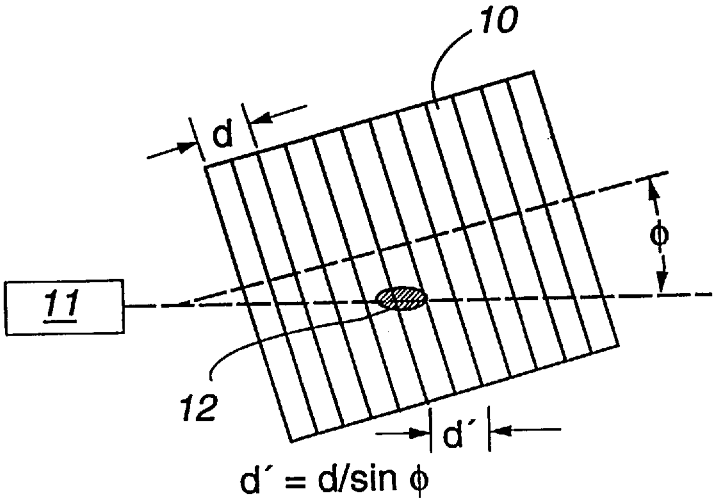

The experimental set up is shown in FIGS. 1A and 1B. Grating 10 is a metal surface on which periodic grooves with spacing d are cut. Electron beam bunch 12 is directed over grating 10 at a height h above grating 10. In a more flexible arrangement, shown in FIG. 1B, grating 10 is mounted to rotate about an axis perpendicular to the grating surface. Then the effective grating spacing d' can be varied by rotating the surface about the axis, where $d'=d/\sin\theta$. Thus, the grating period can be varied in real-time by simply rotating the grating for a particular bunch length measurement.

Far-infrared detectors 16 and 20 detect incoherent 14 and coherent 18 SPR, and may be mounted on goniometers (not shown) that are located sufficiently far from the grating to have adequate angular resolution. In one embodiment, detectors 16 and 20 are rotated to map out the angular distribution of the coherent SPR. For the following exemplary simulations, the experimental parameters were selected with grating period d=0.16 mm, beam height h=0.1 mm, and a beam energy=20 MeV.

For the purpose of studying the capabilities of the new technique for subpicosecond bunch length measurements, calculations were done for a representative case in which a 20-MeV electron beam is compressed in a variable buncher such as a magnetic chicane. The bunch length after compression varies between 0.015 mm (50 fs) and 0.16 mm (533 fs). The grating period is 0.16 mm (groove density~6 lines/mm) and the beam is a one-dimensional line passing over the grating at a fixed height of 0.1 mm. The number of particles in a bunch is assumed to be $10^8$ (charge~16 pC).

Figure 2:
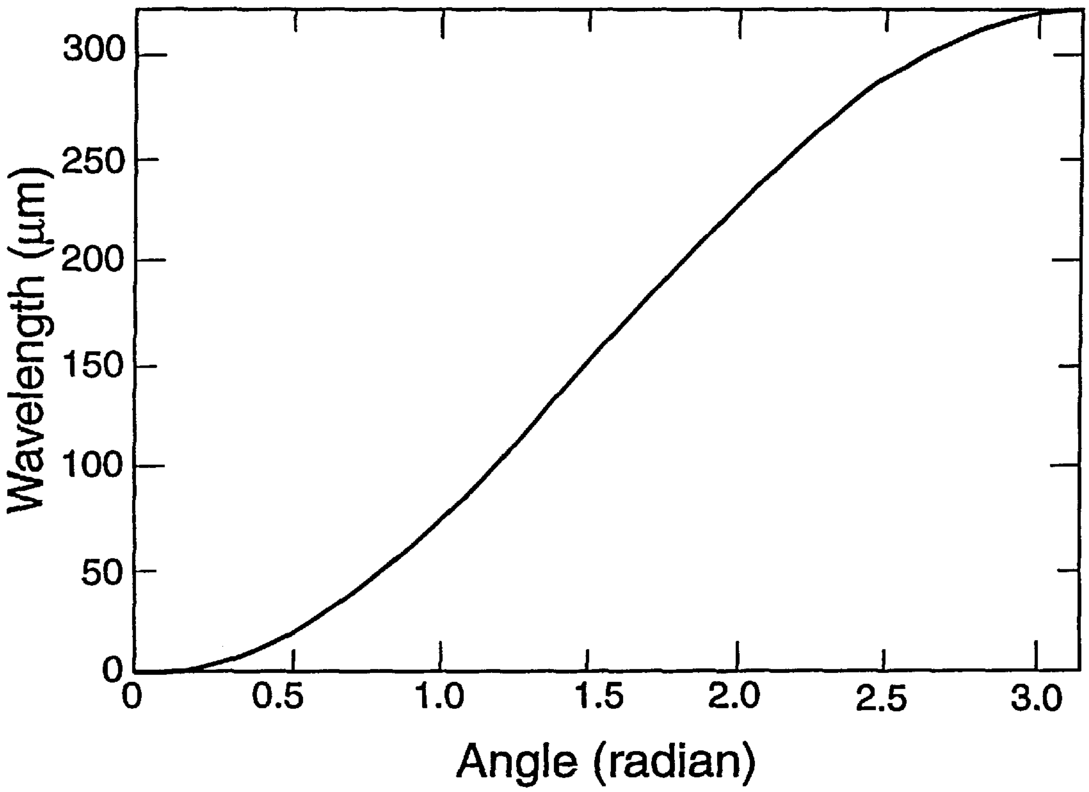
FIG. 2 graphically depicts SPR angular dispersion for an exemplary setup of the apparatus shown in FIG. 1.

The calculated SPR wavelength is plotted versus angle in FIG. 2, showing the typical progression toward longer wavelength at large angles. For relativistic beams ($\beta\sim1$), the plot in FIG. 2 is almost independent of beam energy. Note that the long wavelengths dominate at large angles. When the compressed electron bunches become shorter than the wavelength of light, the different parts of the electron bunch radiate constructively and the resulting radiation becomes coherent—the intensity depends quadratically on the number of electrons. As long wavelengths occur at large angles, the degree of coherence should be enhanced first at long wavelengths and, thus, the coherent SPR is first detected at large angles.

Figure 4:
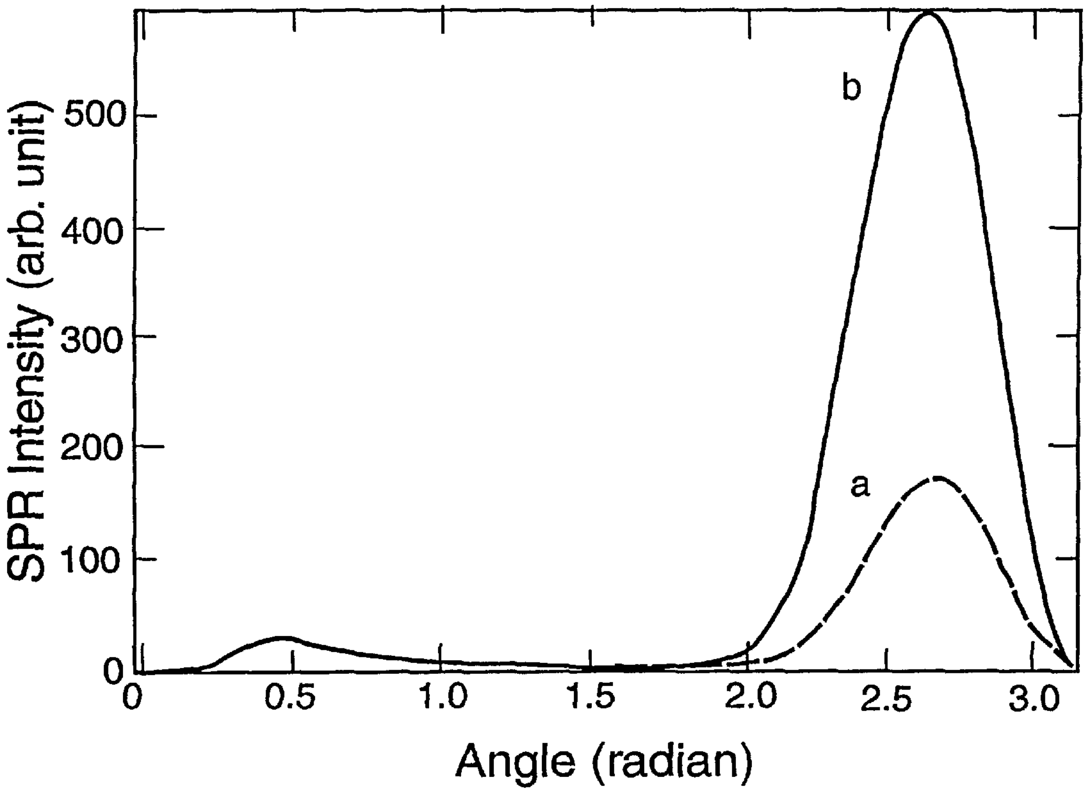
FIG. 4 graphically depicts a calculated SPR intensity-angle distribution for a gaussian bunch with $10^8$ electrons and (a) an rms bunch length of 0.15 mm (500 fs) and (b) an rms bunch length of 0.14 mm.

The calculated intensity-angle distribution of a weakly compressed gaussian bunch with an rms length of 0.16 mm is shown in FIG. 3. The incoherent SPR occurs at a relatively large angle of 0.5 radian because the height-to-period ratio is close to unity. The coherent SPR peak is quite observable at $\theta$=2.7 radians with an intensity approximately 1.7 times that of the incoherent SPR. As the bunch length gets slightly shorter than the grating period of 0.16 mm, the coherent-to-incoherent intensity ratio grows rapidly from approximately 6:1 for a bunch length of 0.15 mm (FIG. 4, curve a) to about 22:1 for a bunch length of 0.14 mm (FIG. 4, curve b). In this regime, the positions of the coherent SPR are approximately the same for all three bunch lengths.

Figure 5:
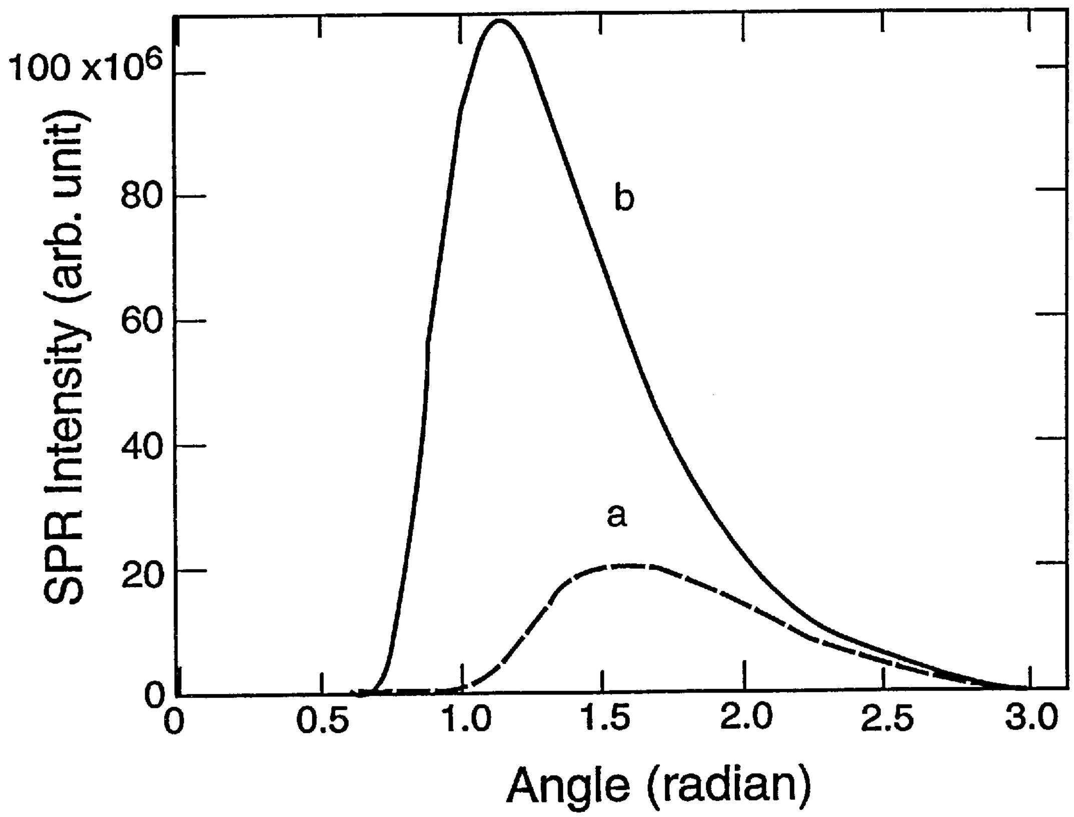
FIG. 5 graphically depicts a calculated SPR intensity-angle distribution for a gaussian bunch with $10^8$ electrons and (a) an rms bunch length of 0.030 mm (100 fs) and (b) an rms bunch length of 0.015 mm (50 fs).

In the regime where the bunch length is much shorter than the grating period, the angular distribution of the coherent SPR peaks at different angles. For example, the coherent SPR emitted by a gaussian electron bunch with an rms length of 0.03 mm (100 fs) peaks at $\theta$=1.6 radians (FIG. 5, curve a), whereas the same bunch with half the length (0.015 mm) peaks at $\theta$=1.2 radians (FIG. 5, curve b).

Figure 6:
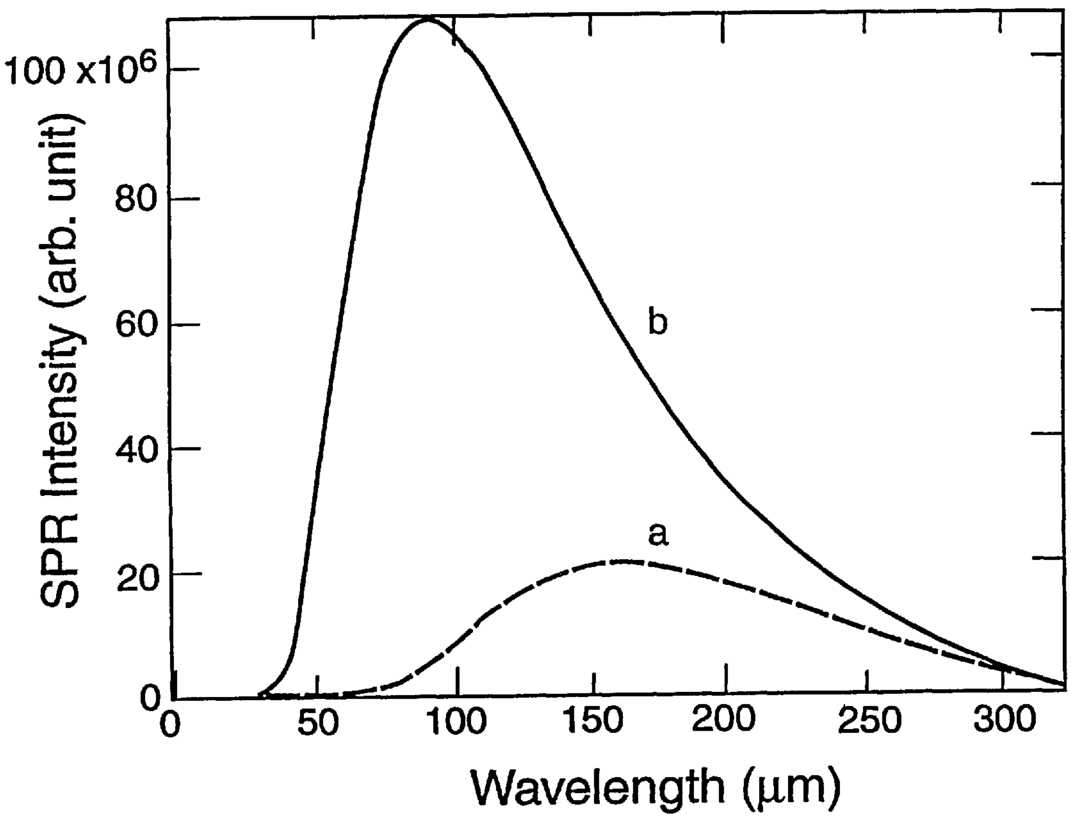
FIG. 6 graphically depicts a calculated SPR spectral distribution for a gaussian bunch with $10^8$ electrons and (a) an rms bunch length of 0.030 mm (100 fs) and (b) an rms bunch length of 0.015 mm (50 fs).

The spectral distributions of the SPR signals collected over all angles can also be used to determine the bunch length. The measured radiation wavelength is approximately the electron bunch length times a constant factor ($2\sqrt{2\ln 2}$). Unlike coherent undulator and coherent synchrotron radiation, coherent SPR from a gaussian-shaped bunch exhibits a peak at a characteristic wavelength depending upon the rms bunch length (FIG. 6, curve a, bunch length=0.030 mm; curve b, bunch length=0.015 mm). This is due to the competing effects of coherent enhancement at long wavelengths and the tendency of SPR emitted by relativistic beams to peak in the forward direction, and thus at short wavelengths.

Figure 7:
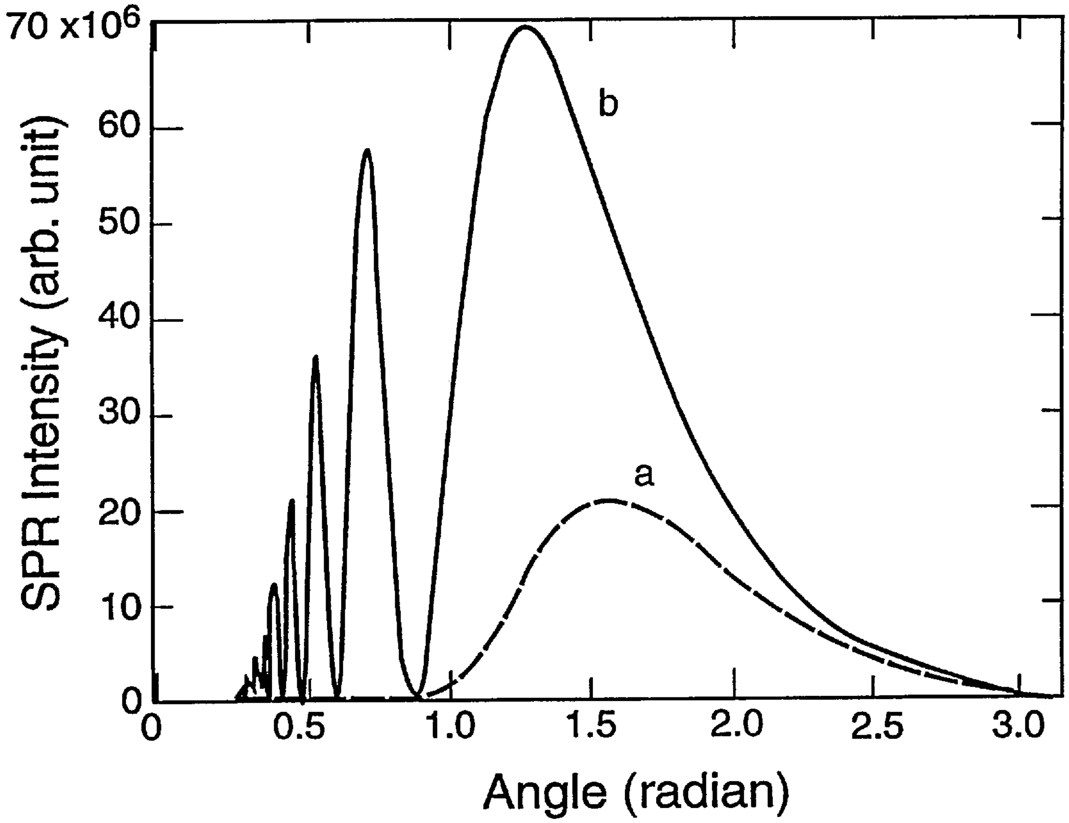
FIG. 7 graphically depicts a calculated SPR intensity-angle distribution for a gaussian bunch with $10^8$ electrons and an rms bunch length of 0.030 mm (100 fs) with (a) a gaussian longitudinal bunch shape and (b) a rectangular longitudinal bunch shape.

The electron bunch shape has a significant effect on the intensity-angle distribution of the coherent SPR signal. As shown in FIG. 7, the angular distribution of a rectangular bunch with a bunch length of 0.03 mm is a rather complex pattern (curve b) compared to the simple distribution of a gaussian bunch with the same bunch length (curve b). Due to the large harmonic content of a rectangular bunch, its intensity-angle distribution exhibits a number of structures at smaller angles in addition to the main lobe. Note that the position of the main lobe is also shifted, a complication that requires a scan over a large range of angles in order to determine the bunch shape prior to measuring the bunch length.

The above conclusions form a new technique of measuring sub-picosecond electron bunch length via coherent Smith-Purcell radiation. This technique requires scanning the detector over a range of angles of observation to determine the intensity-angle distribution of the coherent SPR. The new technique offers a number of advantages: it is simple and inexpensive to set up; it appears to be scaleable to the femtosecond regime; and it does not intercept the electron beam. With an array of detectors, one can measure the intensity-angle distribution of a single electron bunch.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining the length of short electron bunches, comprising the steps of:

forming a metallic grating having a groove spacing greater than a length expected for said electron bunches;

passing said electron bunches over said metallic grating to generate coherent and incoherent Smith-Purcell radiation; and determining the angular distribution of said coherent Smith-Purcell radiation to directly deduce said length of said electron bunches.

2. A method according to claim 1, further including the step of scanning said Smith-Purcell radiation over a large range of angles to evaluate shapes of said electron bunches.

3. A method for determining the length of short electron bunches, comprising the steps of:

forming a metallic grating having a groove spacing greater than a length expected for said electron bunches;

passing said electron bunches over said metallic grating to generate coherent and incoherent Smith-Purcell radiation;

determining the angular intensity distribution of said incoherent and said coherent Smith-Purcell radiation; and obtaining a ratio of said intensity of said incoherent and said coherent Smith-Purcell radiation to directly deduce said length of said electron bunches.

4. A method according to claim 3, further including the step of scanning said Smith-Purcell radiation over a large range of angles to evaluate shapes of said electron bunches.

* * * * *